INFORMATION HANDLING DEVICE
Filed Oct. 26, 1956
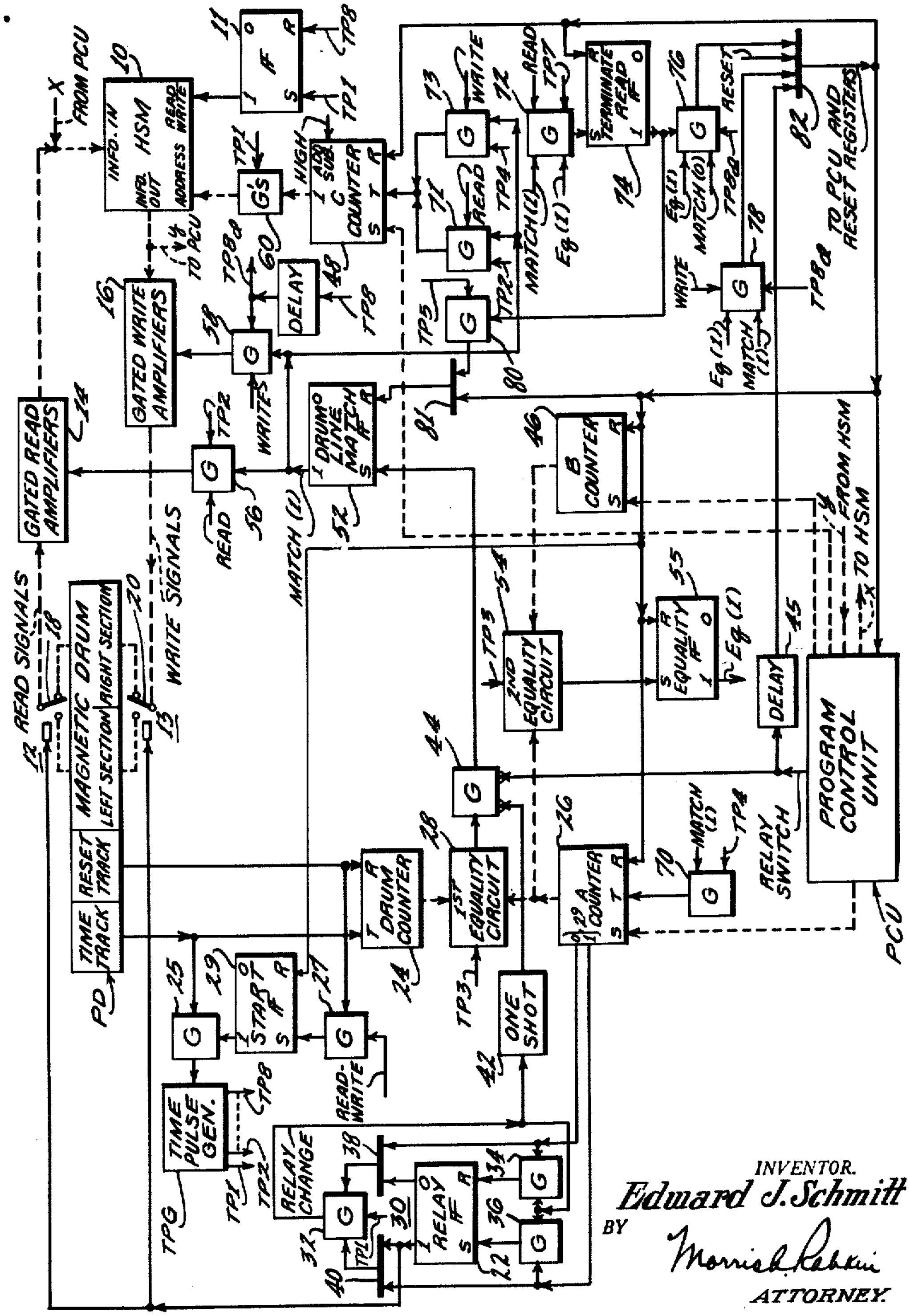
INVENTOR.
Edward J. Schmitt
BY Morris L. Rabkin
ATTORNEY.

United States Patent Office 2,925,589
Patented Feb. 16, 1960

2,925,589

INFORMATION HANDLING DEVICE

Edward J. Schmitt, Haddonfield, N.J., assignor to Radio Corporation of America, a corporation of Delaware Application October 26, 1956, Serial No. 618,493

3 Claims. (Cl. 340—174)

This invention relates to information handling devices, and more particularly to a system for transferring information between a cyclical memory and a high speed random access memory.

A computer is one example of an information handling device which employs internal memories to afford readily accessible storage of instructions and other data information applied to the computer. A program control unit of the computer controls the flow of information among the computer input, the internal memory, the computer output, and other units of the computer, such as an arithmetic unit.

The information may be in the form of characters, each character comprising a group of coded binary signals. An item (sometimes called a word) may be made up of a group of successive characters. A message may include a group of items. For internal storage of information to which especially rapid access is required, a high speed random access memory is usually employed so that the flow of information may be rapidly handled in response to the program control unit. To complement the random access memory, a computer may include a cyclical memory which, for example, may be a magnetic drum memory.

A drum memory usually has a plurality of information channels. Each information channel on the drum or other cyclic memory requires circuits having the ability to write on the drum or read from it. A combination read-write head may be provided for each of the plurality of information channels. In these circuits, separate amplifiers provide the proper signal amplification for signals from each read-write head and the proper current levels for driving each read-write head. In the usual case, only a few of the many information channels of a drum may be read from or written on at any one time. Thus, only a few read amplifiers and a few write amplifiers, corresponding to the number of channels which may be read from or written on at a given time, are employed.

To provide for the connection of these common amplifiers to the particular section (of read-write heads) of the drum in use, relay switches are employed. One group of read-write heads is connected to the common read or write amplifiers at any given time. Relay switching to connect the amplifiers to the proper drum heads requires a considerable amount of time as compared to the normal computing operation. It is therefore desirable to provide a computing system having a pre-switch or anticipating means by which the relay switching may be initiated and the computer continue on with other computer operations during the switching time.

During the course of a computing operation, it often becomes necessary to transfer variable length groups of instructions and other data between the cyclic memory and the random access memory in either direction. In one application of such group or block transfer, stored characters, groups of characters, instructions, or items may be modified by transferring new information from one of these memory devices to the other.

It is an object of this invention to provide a system of transferring information between a cyclical storage device and a random access storage device in either direction.

It is another object of this invention to provide a system for pre-switching to select the desired cyclic memory channels and for continuing with other computing operations while such switching takes place.

Another object of this invention is to provide a system for modifying individual instructions in the random access memory or cyclical storage device of a computer.

A further object of this invention is to provide a system for the transfer of information specified by drum line addresses between the random access memory and a magnetic drum in both directions.

In accordance with the invention, data are transferred between the high speed random access memory, for example, of a computer and a cyclic storage means, such as the magnetic drum of a computer in either direction. Information is stored on or read from the drum using consecutively increasing or decreasing drum lines, while information is stored in or read from the high speed memory using consecutively increasing or decreasing memory positions. Regardless of the direction of transfer, the starting and stopping points of the transfer are specified by the drum lines of the first and last characters to be transferred. If a drum section other than that called for by the drum address has been previously selected, relay switching to the presently selected drum section automatically takes place before the transfer of information can occur.

In the alternative, drum relay switching may be initiated and other computing operations allowed to continue while the relay switching takes place. A later instruction may then effect the transfer without the delay of relay switching time.

The novel features of this invention, as well as the invention itself, both as to its organization and method of operation, will best be understood from the following description, when read in connection with the accompanying drawing, in which like reference numerals refer to like parts, and in which the single figure constitutes a schematic diagram with the components in block form of so much of a computer as provides a clear understanding of the invention itself.

The present invention is embodied in a system which is more fully described in a copending application entitled "Information Handling System," Serial No. 478,021, filed December 28, 1954, by Lowell S. Bensky. The said Bensky application describes an information handling system in detail including the various operations of a program control unit. The present application shows the information handling system described in the said Bensky application in a somewhat modified and abbreviated form including only so much as is necessary to provide a clear and ready understanding of the present invention.

In this computer, the data upon which the computer acts may be stored in a static memory which, by way of example, may comprise the high speed memory 10. Hereafter the abbreviation HSM is employed for high speed memory. The HSM 10 may be of the type employing magnetic cores and may be assumed to include address circuits. The memory 10 also includes read out and write in circuits, which may be actuated by pulses or high levels and is designated by the nomenclature read-write. In the presence of an actuating pulse at the read-write circuit, the memory is placed in condition to receive input information or supply stored information. In this instance, the read-write input of the HSM 10 is actuated by the "one" output of a flip-flop 11. The set input S of the flip-flop 11 is actuated by a first timing pulse TP1 (the source of timing pulses is described below) and the reset input is actuated by an eighth timing pulse TP8. Thus the memory is actuated at the beginning of each cycle of timing pulses and deactivated at the end of each cycle of timing pulses.

The information in or out of the HSM 10 is in the form of binary digits of information or bits, each represented by the level on one of seven leads. Seven bits in this instance, may be stored at each address and written in or read out in parallel. However, one of these seven bits is a parity bit and is ignored for describing the present invention. The information-in and information-out points of the HSM 10 may be assumed to include registers in which the information derived from or to be read into the HSM 10 is staticized.

As will appear more fully hereinafter, a series of timing (that is, clock) pulses are provided in cycles of approximately 20 microseconds. It is assumed that the read-in and read-out circuits, although actuated, are further actuated internally only upon the occurrence of a timing pulse designated TP5. Information may be received by the memory from its registers and transferred out of the memory to its registers throughout the period from timing pulse TP5 to timing pulse TP6. A memory of magnetic cores may be employed or a vacuum tube memory such as a selectron may be employed.

A cyclic storage device PD, which may be a program drum, is supplied in a known manner with a timing track and a reset track. The program drum PD is preferably a magnetic drum continuously rotated. As the drum rotates, pulses are generated in reading heads (or other transducing means) from the timing track in synchronism with lines of information written on the drum in the form of binary numbers magnetically stored in the several data channels (in this case assume 12 data channels). With the occurrence of every other pulse from the timing track the timing pulse generator TPG generates a series of eight timing pulses designated as TP1 to TP8, respectively. The particular manner of generation of timing pulses is described more fully in a copending application entitled "Pulse Generator" by Martin Kaplan, Serial No. 502,572, filed April 20, 1955.

Six of the twelve data channels on the magnetic drum PD are written on or read from by six left section read-write heads (not shown). Similarly, the other six data channels are written on or read from six right section read-write heads (not shown). The read-write heads for the left and right sections are selectively coupled through six relays 12 to six gated read amplifiers 14. The read-write heads for the left and right magnetic drum PD sections are selectively coupled through six write relays 13 to six gated write amplifiers 16.

Each of the read and write relays 12 and 13 include movable contacts 18 and 20, respectively. When the relays 12 and 13 are not energized, the contacts 18 and 20 are normally made to the right section read-write heads of the magnetic drum PD as shown in the drawing. When energized, the relay contacts 18 and 20, respectively, connect the left section read-write heads to the gated read and write amplifiers 14 and 16 respectively. The relays 12 and 13 are controlled by a relay switching circuit 30. Specifically the relays 12 and 13 are actuated by the "one" output of a relay flip-flop 22 included in the switching circuit 30 which will be described in more detail hereinafter.

The reset track of the drum PD is coupled to the reset input R of a drum counter 24 and to one input of a two-input Read-Write gate 27. Similarly, the timing track from the drum PD is coupled to the trigger input terminal T of the drum counter 24 and to the input of a timing pulse generator TPG through a two-input "and" gate 25. The second input to the gate 25 is provided by the "one" output of a start flip-flop 29. The start flip-flop 29 has a set input S which is coupled to the output of the read-write gate 27. The remaining input to the gate 27 is actuated by a high level voltage Read or Write signal from a keyboard or from the program control unit PCU. The drum counter 24 may be a counter of nine stages. Each of the counters and registers herein may be flip-flop counters or registers.

A flip-flop is a circuit having two stable states, that is, conditions, and two input terminals, one of which may be designated as reset, the other set. The flip-flop may assume the set condition in response to application of either a high level or a positive going pulse on the set input terminal S or the reset condition by the application of either a high level or a positive going pulse on a reset terminal R. Two outputs are associated with the flip-flop circuit which are given the Boolean tags of "one" and "zero." If the flip-flop is set, that is, in its set condition, the "one" output voltage is high and the "zero" output voltage is low. Unless otherwise indicated, the outputs from the flip-flop are taken from the "one" terminal. If the flip-flop is reset, that is, in its reset condition, the "one" terminal is low and the "zero" terminal is high. A flip-flop may also be provided with a trigger terminal T. Application of a pulse to the trigger terminal T causes the flip-flop to assume the other condition from the one it was in when the pulse was applied. Counters are formed from flip-flops in a known manner.

An A counter 26 is provided having ten flip-flop stages. The first nine of these ten flip-flop stages represent the binary bits $2^0$ to $2^8$, inclusive, and the outputs of these nine stages are applied to a first equality circuit 28. Other inputs of the first equality circuit 28 are from the flip-flop stages of the drum counter 24. The first equality circuit 28 also receives an input from a third timing pulse TP3 of a series of timing pulses. An output gated at the time corresponding to the timing pulse TP3 is derived from the first equality circuit 28 upon equality between the flip-flop stages of the drum counter 24 and the A counter 26.

The equality circuit 28 may, for example, comprise a group of "and" gates (not shown). There are two "and" gates for each corresponding stage of the two counters, one of the two "and" gates receiving the "one" outputs and the other gate the "zero" outputs for each stage. The outputs of each pair of "and" gates corresponding to each of the stages, respectively, of the counters are supplied in pairs through "or" circuits to a single output two-input "and" gate (not shown). The third timing pulse TP3 provides the second input to the output "and" gate. Accordingly, the first equality circuit 28 has a pulse output at the time of the third timing pulse TP3 if, and only if, the binary number in the drum counter 24 is the same as the binary number in the A counter 26.

In the drawings, multiple leads are indicated by dotted lines. Each lead of these multiple leads carries, as the machine operates, a bit (binary digit of information) represented by one of only two possible voltage levels, one high and one low. Therefore, the lines themselves sometimes are represented as bits (binary digits of information).

The tenth flip-flop stage of the A counter 26 has its "one" and "zero" outputs coupled to the relay switching circuit 30. As noted above, the relay switching circuit 30 includes the relay flip-flop 22. The relay switching circuit 30 provides an output relay change signal from an "and" gate 32 in the event that the $2^9$ bit of the A counter 26 indicates that a section of the magnetic drum PD is to be selected other than the one that is presently selected. If the "one" output of the tenth flip-flop stage ($2^9$ bit) of the A counter 26 is high, the left section of the drum PD is selected. Conversely, if the "zero" output of the tenth flip-flop stage of the A counter 26 is high, the right section of the drum PD is selected.

The "zero" output of the tenth stage of the A counter 26 is coupled to one input of a two-input "and" gate 34 and to one input of an "or" circuit 38. Similarly, the "one" output of the tenth flip-flop stage of the A counter 26 is coupled to one input of a two-input "and" gate 36 and to one input of an "or" circuit 40. Each of the "or" circuits 38 and 40 has two inputs.

In the drawings, a special convention is adopted for the showing of an "or" circuit. According to this convention, the inputs to the "or" circuit are indicated by arrowheads drawn perpendicular to a bar. A single line perpendicular to and extending from the center of this bar indicates the output.

The remaining input to each of the "and" gates 34 and 36, respectively, is from the output of the relay change signal "and" gate 32. The output of each of the "and" gates 34 and 36, respectively, are coupled to the reset and set inputs of the relay flip-flop 22. The "zero" and "one" outputs, respectively, of the relay flip-flop 22 are coupled to the "or" circuits 38 and 40, respectively. The outputs of each of the "or" circuits 38 and 40 are coupled to the relay change signal "and" gate 32. The final input to the change signal "and" gate 32 is from the first timing pulse TP1 such that if an output signal is to occur, such signal occurs during the first timing pulse TP1. The "one" output of the relay flip-flop 22 is also coupled to each of the drum switching relays 12 and 13, respectively.

The output of relay change signal "and" gate 32 is also coupled to the input of a one-shot multivibrator 42. As is known, a one-shot multivibrator upon being actuated provides a single output pulse or level for a predetermined time duration. The output of the one-shot multivibrator 42 is coupled to an inhibit input of a gate 44. The gate 44 receives a normal gating input from the output of first equality circuit 28.

Most of the gates herein are all logic "and" gates, sometimes referred to as coincidence gates, and are indicated by a rectangle with the priming leads bearing arrowheads directed toward the rectangle. The gate 44, however, is an inhibit gate which provides an output when there is an input from the first equality circuit 28 and, at the same time, an absence of any inhibit inputs. The inhibit inputs to the gate 44 are indicated in this instance by an arrowhead drawn to a half circle placed adjacent the rectangle indicating the gate. Another inhibit input to the gate 44 is received from a relay switch output of the program control unit PCU. The function of this relay switch signal is described in some detail below. The output of the gate 44 is coupled to the set input S of a drum line match flip-flop 52.

The "one" output of the drum line match flip-flop 52 is coupled to one input of each of two three-input gates 56 and 58. The remaining two inputs to the gate 56 are received from the second timing pulse TP2 and from a READ input which may, for example, be a high level from the program control unit PCU. The output of the three-input gate 56 is coupled to the gating input of each of the gated read amplifiers 14. The three-input gate 58 receives its remaining inputs from the eighth delayed timing pulse $TP8_d$ and from a Write input which may, for example, be derived from the program control unit PCU. The manner in which computer instructions may be interrupted by the program control unit to supply, for example, Read or Write signals is more fully described in the said Bensky application.

The outputs of the gated read amplifiers 14 are coupled to the information in (info-in) inputs to the HSM 10. Similarly, the information out (info-out) terminals of the HSM provide six parallel bits to the respective gated write amplifiers 16.

The "one" outputs of a C counter 48 are coupled through a plurality of gates 60 to the address input of the HSM 10. Each of the gates 60 is gated by the first timing pulse TP1. The C counter 48 is a reversible counter, but may, for the purposes of this application, be considered to be continuously in the subtract mode as is indicated by a high level input being applied to the subtract input. In this manner successively decreasing memory addresses are employed. Note that the subtract mode is an arbitrary selection and the counter may operate in the add mode, if desired.

The "one" output of the drum line match flip-flop 52 is also coupled to one input of a three-input gate 71 and one input of a three-input gate 73. The outputs of each of these gates 71 and 73 is coupled to the trigger input T of the C counter 48. The remaining inputs to the first gate 71 are provided by the second timing pulse TP2 and the Read input from the program control unit PCU. The remaining inputs to the gate 73 are provided by the fourth timing pulse TP4, and the Write input from the program control unit PCU.

The program control unit PCU controls the flow of data between the HSM 10 and itself by the Read and Write levels. The paths of this information flow between the program control unit PCU and the HSM 10 are indicated by the short arrows terminated by the small letters $x$ and $y$. The program control unit PCU may include an arithmetic unit and thus perform logical operations such as addition, subtraction, multiplication, etc., on the data in the HSM. Further, the program control unit is connected to apply signals to the set inputs of the A counter 26, of the B counter 46, and of the C counter 48, respectively. In this instance, the program control unit PCU functions to supply the addresses to the set inputs of the several counters. The address supplied to the A counter is the drum line address on the magnetic drum PD of the beginning point at which information is to be read from or supplied to the drum. The address supplied to the B counter 46 is that of the magnetic drum line address of the stopping point at which the information is to be read from or supplied to the drum. The address supplied to the C counter 48 is that of the HSM address of the beginning point of the information transfer, regardless of the direction of the transfer, whether into or out of the HSM 10. As is indicated by the dotted lines, these addresses are supplied on parallel channels to the individual stages of the several counters. Note that these several addresses may be placed into the respective counters by a keyboard arrangement. Further, each of the counters may be reset by a D.C. switching voltage from such a keyboard arrangement.

The outputs of the A counter 26 and B counter 46 are coupled to the inputs of a second equality circuit 54. The second equality circuit 54 is similar in function to the first equality circuit 28. The second equality circuit 54 is gated by the third timing pulse TP3 and provides an output to the set input S of an equality flip-flop 55 when, and only when, the inputs from the A counter 26 and the B counter 46 are equal. The "one" output of the equality flip-flop 55 is indicated merely by an arrowhead which is labeled Eq. (1). The several points throughout the drawing to which this output is coupled are indicated simply by similar arrows labeled with the symbol Eq. (1).

Receipt of an output signal from the second equality circuit 54 indicates that the final drum line address has been reached and that the specified transfer is complete.

The output of a two-input gate 70 is coupled to the trigger input T of the A counter 26. The two-input gate 70 receives inputs from the fourth timing pulse TP4 and the Match (1) output from the drum line match flip-flop 52.

The present system includes termination circuitry which resets each of the counters and controls flip-flops to "zero" and sends an instruction complete signal to the program control unit PCU in order that the Read or Write levels may be removed and a following instruction executed as described in the Bensky application.

The termination circuitry for the operation of block transfer includes a four-input gate 72, a terminate read flip-flop 74, a four-input gate 76, a four-input gate 78, and a two-input gate 80. The four-input gate 72 receives inputs respectively from the "one" output (Match (1)) of the drum line match flip-flop 52, from the "one" output Eq. (1) of the equality flip-flop 55, from the Read signal from the program control unit PCU, and from the seventh timing pulse TP7. The output of the gate 72 is coupled to the set input S of the terminate read flip-flop 74. The "one" output of the terminate read flip-flop 74 is coupled to one input of the two-input gate 80 and to one input of the gate 76. The remaining input to the gate 80 is provided by the fifth timing pulse TP5. The output of gate 80 is coupled to the reset input R of the drum line match flip-flop 52 through an "or" circuit 81.

The remaining inputs to the four-input gate 76 are received from the "one" output Eq. (1) of the equality flip-flop 55, by the "zero" output Match (0) of the drum line match flip-flop 52, and by the eighth delayed timing pulse $TP8_d$. The output of the four-input gate 76 is coupled to one input of a four-input "or" circuit 82. In a similar manner, the output of the terminate write gate 78 is coupled to a second input of the "or" circuit 82. The terminate write gate 78 receives inputs, respectively, from the Write level from the program control unit, from the "one" output Eq. (1) of the equality flip-flop 55, the "one" output Match (1) of the drum line match flip-flop 52, and the eighth delayed timing pulse $TP8_d$. The output of the "or" circuit 82 is coupled to the program control unit PCU to indicate completion of the block transfer operation, and to the reset inputs R, respectively, of the C counter 48, the B counter 46, the A counter 26, the equality flip-flop 55, the drum line match flip-flop 52, the terminate read flip-flop 74, and the start flip-flop 29.

The relay switch only output from the program control unit PCU is also coupled through a delay circuit 45 to the third input of the "or" circuit 82. The fourth input to the "or" circuit 82 is indicated as a reset input. This input may, for example, be a D.-C. voltage level from a keyboard.

In operation, the program control unit PCU may interpret computer instructions in the manner described in the said Bensky application and provide addresses to the A, B and C counters 26, 46 and 48, respectively, to control the transfer of information. Note, however, that these addresses may be entered into the several counters manually by a keyboard or similar mechanism. Further, a reset input may be applied either manually from a switching signal source or the program control unit PCU through the "or" circuit 82 to reset each of the counters and control flip-flops prior to operation.

Assume that an instruction calling for a block transfer of information from the HSM 10 to the drum PD is entered into the program control unit PCU. Upon the interpretation of such a block transfer instruction as described in the Bensky application, the program control unit PCU transfers the addresses which control the transfer into the several counters 26, 46, and 48. The address of the drum line on the magnetic drum PD at which the transfer is to begin is supplied to the set inputs S of the A counter 26. The drum line set into the B counter 46 is the drum line of the magnetic drum PD at which the transfer of information ends. The address entered into the C counter 48 is that HSM 10 address of the most significant digit of the information being transferred from the HSM 10 to the drum PD. In this instance, the program control unit provides a high level Write signal to the gate 73, to the gate 58, and to the gate 27.

The reset pulse from the reset track on the magnetic drum PD resets the drum counter 24 to "zero" and passes through the primed gate 27 to set the start flip-flop 29. The "one" output of the start flip-flop 29 primes gate 25. Gate 25, thus primed, passes successive clock pulses from the timing track to the timing pulse generator TPG. With the receipt of each clock pulse, the timing pulse generator TPG generates a series of eight timing pulses TP1 to TP8, inclusive. With the first timing pulse TP1, the C counter 48 addresses the HSM 10 through the gates 60. Information may thus be read into or out of the HSM at this address during each cycle of timing pulses. In this regard, the read-write flip-flop 11 is set each TP1 and is reset each TP8 to allow the HSM 10 address circuits sufficient time to recover between cycles as is required in some memories. Each clock pulse from the timing track advances the count, corresponding to the drum line presently under the read-write heads of the drum counter 24.

Upon reaching equality with the drum line address stored in the A counter 26 of the beginning point of the transfer, the first equality circuit 28 passes the third timing pulse TP3 to the gate 44. If no inhibit inputs are present at the remaining two inputs of the gate 44, an output signal passes to the set input S of the drum line match flip-flop 52. The drum line match flip-flop 52 now provides a high level output Match (1) on its "one" output terminal. The Match (1) output of the drum line match flip-flop 52 primes the gate 58. Upon the occurrence of each eighth delayed timing pulse $TP8_d$ thereafter the gate 58 primes the gated write amplifiers 16. The write amplifiers apply the information withdrawn from the HSM 10 storage location addressed during TP1 by the C counter 48, which information is now present in the HSM 10 output registers, on the selected left or right sections of the drum PD as will be described below.

Note that the address held in the C counter does not change until such time as equality between the drum counter and the A counter occur, and the drum line match flip-flop 52 becomes set. Only then does the drum line Match (1) output open the gate 73, and until then the C counter remains unchanged.

During each third timing pulse TP3 both the first and second equality circuits 28 and 54, respectively, are tested for equality between the drum counter 24 and the A counter 26, and between the A counter 26 and the B counter 46, respectively. A further indication of equality by the first equality circuit 28 is of no import because the drum line match flip-flop 52 was previously set. An equality indication by the second equality circuit 54 starts a termination sequence by which the block transfer operation ceases.

Once the starting drum line is reached and equality recognized, the fourth timing pulse TP4 also passes through the gate 70 primed by the Match (1) output of the drum line match flip-flop 52 and advances the count of the A counter 26 by one. Also the fourth timing pulse TP4 passes through the gate 73 primed by the write input from the program control unit PCU and the Match (1) output of the drum line match flip-flop 52 to decrease the count in the C counter 48 by one.

Thus with each cycle of timing pulses the transfer of information takes place from successive decreasing addresses in the HSM 10 to successive increasing drum line locations in the magnetic drum PD. With every succeeding clock pulse from the magnetic drum corresponding to each drum line the HSM 10 is addressed at a successive lower memory location by the first timing pulse TP1. The third timing pulse TP3 compares the A and B counters 26 and 46, respectively, to ascertain if the drum line presently under the read-write magnetic heads is the stopping point of the transfer of information. The fourth timing pulse TP4 increases the count in the A counter 26 to the drum line address of the next succeeding drum line and decreases the HSM address in the C counter 48 of the HSM storage location of the next successive character of information. The gated write amplifiers 16 pass another character of information (six bits) to the selected section of the magnetic drum PD during the eighth delayed timing pulse $TP8_d$.

With the occurrence of a fourth timing pulse TP4 the A counter 26 advances to register the drum line that will appear under the drum read-write heads during the next succeeding cycle of timing pulses. Assume the final drum line is reached and the drum line address count in the A counter 26 is the same as that appearing at the B counter 46. Upon the occurrence of the third timing pulse TP3 of the next cycle of timing pulses, the second equality circuit 54, ascertaining equality between the A counter 26 and the B counter 46, sets the equality flip-flop 55. The termination sequence thus begins and with the advent of the eighth delayed timing pulse $TP8_d$ the last character to be transferred from the HSM to the drum passes through the write amplifiers 16 from the HSM 10 output register and is recorded on the magnetic drum PD.

Once the equality flip-flop 55 is set, the terminate write gate 78, primed by the Write input from the program control unit PCU and the Match (1) output of the drum line match flip-flop 52 passes the eighth delayed timing pulse $TP8_d$ through the "or" circuit 82. The signal passed through the "or" circuit 82 indicates to the program control unit PCU that the operation is complete so that the Write operation level may be removed. The output signal from the "or" circuit 82 also resets the A counter 26, the equality flip-flop 55, the B counter 46, the drum line match flip-flop 52, the terminate read flip-flop 74, the C counter 48, and start flip-flop 29. The program control unit PCU may now direct the computer to other operations.

Included in the A counter address of the starting point of the transfer is a $2^9$ binary bit which determines whether the information is to be stored in the left section or right section of the magnetic drum PD. If the $2^9$ binary bit is a "one," the left section is denoted. If, on the other hand, the $2^9$ bit is a "zero," the right section of the drum PD is indicated. This determination is made by the drum section selection circuitry 30. The operation will be clear from an example.

Assume that in the previously described instruction to transfer information from the HSM 10 to the drum PD, a "one" had been introduced in the A counter $2^9$ bit thereby instructing that the transfer is to be to the left section of the drum PD. Assume also that the right section of the drum had previously been operated upon such that the relay flip-flop 22 is in the reset condition. Under these conditions, the high "one" output of the $2^9$ bit of the A counter 26 passing through "or" circuit 40 primes the gate 32. The high "zero" output of the relay flip-flop 22 passes through the "or" circuit 38 and primes the second input to the gate 32. Upon the occurrence of the first timing pulse TP1, the gate 32 passes the first timing pulse TP1 as a relay change signal. The relay change signal triggers the one-shot multivibrator 42. The output of the one-shot multivibrator 42 inhibits the gate 44 such that the drum line match flip-flop 52 cannot activate the HSM read-write circuit, the C counter 48, address input, and the read and write amplifiers 14 and 16, respectively. The inhibit signal from the one-shot multivibrator 42 is present for the period of time required for the relays 12 and 13 to switch from the left section read-write heads to the right section read-write heads, or to switch in the opposite direction. In this manner, the drum line match flip-flop 52 remains reset and no transfer of information to or from the drum PD is permitted until the drum relays 12 and 13 have switched and settled to a stable state.

The relay change signal from the gate 32 also passes through the "and" gate 36, primed by the high level "one" output of the $2^9$ bit of the A counter 26, to the set input S of the relay flip-flop 22. The flip-flop 22 becomes set and provides a high level "one" output activating the relays 12—13. The relay contacts 18 and 20 respectively are now moved to the left as viewed in the drawing, and couple the read-write heads for the drum channels in the left section of the drum PD to the gated read amplifiers 14 and gated write amplifiers 16, respectively.

By way of summary, the $2^9$ bit of the A counter is compared in the relay switching circuit 30 with the present condition of the relays 12—13. If drum relay switching is required, a delay is initiated which inhibits setting the drum line match flip-flop 52. When switching is complete, the system looks for a match between the drum counter and the A counter. When a match has been established, the drum line match flip-flop 52 is set and the transfer of information begins. Information transfer continues until the A and B counters are equal and the information to be read to the drum line held by the B counter has been transferred. Once this last transfer occurs, the counters are reset and a signal is sent to the program control unit indicating completion of the operation.

Termination of transfer of a block of one or more characters from the drum PD to the HSM 10 is somewhat more complex than the termination of transfer from the HSM 10 to the drum PD. Therefore, a detailed description of such transfer will be given by way of the following illustrative example. Assume that an instruction is received by the program control unit whereby the machine is directed to transfer that block of characters between the drum line address beginning on drum line number 1001 (octal base) and ending on drum line number 1003 (octal base) to those HSM locations whose most significant digit has the address of 0136 (octal base). Assume also that the right section of the magnetic drums have been previously utilized and the drum section relays 12—13 are so connected. The relay flip-flop 22 is thus in a "zero" condition indicating that the drum switching relays 12—13 are presently coupled to the drum right section read-write heads.

Conforming to this instruction, the program control unit PCU places the binary equivalents of the several addresses in the several counters, and provides a high level Read output. It is assumed that the several control flip-flops are reset either on the termination of a prior instruction or by the application of a reset signal at the reset input of the "or" circuit 82. The binary representation 1000000001 (corresponding to 1001, octal base) is set into the A counter. Similarly, the binary number 1000000011 (corresponding to 1003, octal base) is set into the B counter 46, and 0001011110 (corresponding to 0136, octal base) is set into the C counter 48. The Read signal primes the gate 27 such that the reset pulse from the drum PD which resets the drum counter 24, sets the start flip-flop 29. The start flip-flop 29 now primes the gate 25 such that the next clock pulse corresponding to the "zero" (first) drum line passes to the timing pulse generator TPG and the first cycle of eight timing pulses TP1 to TP8, inclusive, is generated. "And" gate 32 in the drum relay selection circuit 30 is primed by the "one" output from the $2^9$ bit of the A counter 26 applied through "or" circuit 40, and by the high "zero" output of the relay flip-flop 22 through the "or" circuit 38 and passes the first timing pulse TP1. The output of gate 32 is the relay change signal. The relay change signal primes "and" gate 36. "And" gate 36, previously primed by the high "one" output of the $2^9$ bit of the A counter 26, sets the relay flip-flop 22. The "one" output of the relay flip-flop 22 becomes high and actuates the drum relays 12—13, respectively, such that these relays are switched to couple the left section of the drum read-write heads to the respective gated read amplifiers 14 and gated write amplifiers 16.

The relay change signal triggers the one-shot multivibrator 42 whose output inhibits the gate 44 and prevents the output of the first equality circuit 28 from setting the drum line match flip-flop 52. The one-shot multivibrator 42 provides an output signal having a time duration equal to the time required for the drum relays 12 and 13 to switch from one condition to another. Thus, it is apparent in the block transfer of characters that, if relay switching is required, such switching is effected automatically and the transfer circuits are inhibited until the relay switching is complete.

After the one-shot multivibrator 42 returns to its normal state, the inhibit signal is removed from the gate 44. The successive clock pulses from the drum timing track generate successive sequences of timing pulses TP1 to TP8. When the count in the drum counter 24 equals the address set in the A counter 26, indicating that the desired starting drum line 1001 (octal base) has been reached, the third timing pulse TP3 provides an equality signal from circuit 28 which passes to the gate 44. The gate 44 now passes the equality signal to the set input S of the drum line match flip-flop 52. The drum line match flip-flop 52 is set and the Match (1) output is now high. The fourth timing pulse TP4 advances the A counter address by one. The A counter now holds the drum line address 1002 (octal base).

With the next clock pulse from the timing track of the magnetic drum PD, the first timing pulse TP1 causes the C counter 48 to address the HSM 10 with the C counter 48 address of 0136 (octal base). Upon the occurrence of the second timing pulse TP2, the gated read amplifiers 14 pass the binary bits read from the drum line address 1001 (octal base) to the corresponding HSM 10 location 0136. Note the writing on the drum at a particular storage location occurs during $TP8_d$ of the cycle of timing pulses initiated for the clock pulse corresponding to that storage location. Reading from the drum, on the other hand, takes place during TP2 of the succeeding cycle of timing pulses corresponding to the next succeeding clock pulse for the next storage location. Since this reading and writing relationship is consistently maintained, the information read during TP2 of the cycle of timing pulses initiated by the clock pulse at storage location 1002 (octal base) is the information previously stored at drum storage location 1001 (octal base). The second timing pulse TP2 also passes through the gate 71 to reduce the address count in the C counter by one to 0135. Similarly, the fourth timing pulse TP4 passes through the gate 70 and advances the drum line address in the A counter to 1003.

With the next clock pulse from the drum PD, the first timing pulse TP1 passes the C counter 48 address 0135 into the address registers of the HSM 10. Upon the advent of the second timing pulse TP2 the information (character) from drum line 1002 is transferred to the HSM 10. Also the second timing pulse TP2 reduces the C counter 48 address to 0134. With the third timing pulse TP3 equality is observed between the A counter 26 and the B counter 46. The second equality circuit 54 thereby sets the equality flip-flop 55. The "one" output of the equality flip-flop 55 is high and is designated Eq. (1). The fourth timing pulse TP4 advances the A counter to the drum line address 1004. This count, however, is no longer of any consequence, since the equality flip-flop 55 was previously set. With the seventh timing pulse TP7, the gate 72, being primed by a high level from the Read signal from the program control unit PCU, by Match (1), and by Eq. (1), passes the seventh timing pulse TP7 to the set input of the terminate read flip-flop 74.

Upon the receipt of the next clock pulse from the magnetic drum PD, the first resulting timing pulse TP1 sets the final C counter address 0134 into the HSM 10. This address, it will be recalled, triggered the C counter on the second timing pulse of the preceding cycle. The second timing pulse TP2 passes through the gates 56 to allow the gated read amplifiers 14 to pass the information contained in the last drum line address 1003 into the HSM. The fifth timing pulse TP5 passes through the "and" gate 80, primed by the high level of the "one" output of the terminate read flip-flop 74 to reset the drum line match flip-flop 52. With the resetting of the drum line match flip-flop 52, the gated read amplifiers are effectively inhibited by the removal of priming signals from their activating gate circuits 56. Similarly, the trigger inputs to the C counter 48 and the A counter are inhibited. With the occurrence of the eighth delayed timing pulse $TP8_d$, the gate 76 being primed by Eq. (1) and the "zero" output of the drum line match flip-flop 52, passes an output signal through the "or" circuit 82. The "or" circuit 82 indicates to the program control unit PCU that the instruction is complete. The same signal which passes through the "or" circuit 82 resets the A counter 26, the equality flip-flop 55, the B counter 46, the terminate read flip-flop 74, the start flip-flop 29, and the C counter 48.

By the operation of block transfer, as described herein, characters or other information may be transferred between the HSM and the drum memory in varying amounts determined only by the capacity of the two memories. In addition, as little as one character at a time from a given drum line or given HSM address may be transferred. In this manner, single instruction which may be stored in either the HSM or the magnetic drum may be readily modified simply by transferring the new changed instruction into that particular storage location. If, during this transfer, drum relay switching is required, such switching is performed automatically depending upon the selected drum address. In the event drum switching is required, the remainder of the computing operation is automatically inhibited until the completion of such switching.

This block transfer operation may, for example, find extensive use in conjunction with a read-in from tape operation which is disclosed, for example, in the Bensky application. Before reading in from tape, the item addresses may be stored in the HSM. The storage of these addresses may be accomplished in a rapid time by a block transfer from the drum memory.

A technique which may be designated as pre-switching may be employed to reduce the relay switching delays by allowing the switching process to occur in parallel with other computer operations. As noted above, in accordance with this invention, the relay switching process is automatic whenever access to the drum memory is required. However, by use of an additional instruction from the program control unit, relay switching may be initiated, the remainder of the transfer operation inhibited, and the computer allowed to perform other computing operations. After completion of such switching a block transfer instruction may be entered into the program control unit PCU and the transfer take place, as hereinabove described.

In the event such a pre-switching instruction is entered into the program control unit PCU, a relay switch output inhibits the gate 44. In this pre-switch operation, the correct drum line address containing the $2^9$ bit is entered into the A counter 26 as described above. The relay switching circuitry 30 ascertains whether the relay switching is to occure or not, as described above. If relay switching is to occur, such switching is initiated by the relay flop-flop 22 being set or reset as the case may be, dependent upon the $2^9$ bit of the A counter 26. The time duration of the relay switch inhibit input to the gate 44 is a finite period of time equal to that required to initiate the switching operation. This time duration is determined by the delay circuit 45. During this period of time that the relay switch signal is high, even though a match may occur between the drum counter 24 and A counter 26, setting the drum line match flop-flop 52 to indicate such match is prevented by the inhibit input to the gate 44. In this manner, no transfer of information may take place in either direction between the drum PD and the HSM 10.

After this finite period of time required to initiate the relay switching of the relay switching circuit 30, the relay switch signal passes out of the delay circuit 45 and through the "or" circuit 82. Upon receipt of the signal from the "or" circuit 82, the relay switch signal is removed from the gate 44. Simultaneously, the several counters and control flip-flops are reset, and the program control unit PCU may go into the next instruction. While the next instruction is being executed, the mechanical switching of the relay armatures is taking place.

There has thus been described a relatively simple system for transferring information between the cyclic memory and the random access memory of an information handling system in a small amount of time. With such transfer operation, as little as one character at a time may be transferred between these memories. Such system allows the ready modification of instructions and other data stored in either memory in a small amount of time and provides automatically for any relay switching required to obtain access to the cyclic memory. Further, pre-switching of such relays may be employed to economize computer time.

What is claimed is:

1. A system for transferring data from a magnetic drum to a random access memory comprising, the combination, means for providing synchronizing signals corresponding to data storage locations on said drum, a drum counter responsive to said synchronizing signals, a first counter for holding a count corresponding to one of said drum storage locations, a first equality circuit for recognizing equality between said drum counter and said first counter, a bistable circuit having a set stable condition and a reset stable condition, said first equality circuit being adapted to place said bistable circuit in the set condition upon equality between said drum counter and said first counter, transfer circuitry responsive to said set condition of said bistable circuit and to said synchronizing signals for transferring said data from said drum to said memory, a second counter for holding a count corresponding to the drum storage location to which said information transfer is to cease, a second equality circuit for recognizing equality between said second counter and said first counter, said second equality circuit being adapted to place said trigger circuit in the reset condition upon equality between said first and said second counters, a third counter for addressing said memory, said first and said third counters having trigger inputs responsive to coincidence of said synchronizing signals and said bistable circuit in its set condition, and means responsive to said second equality circuit upon equality between said drum counter and said first counter for resetting each of said counters and said bistable circuit.

2. A system for transferring data from a random access memory to a magnetic drum comprising, the combination, means for providing synchronizing signals corresponding to data storage locations on said drum, a drum counter responsive to said synchronizing signals, a first counter for holding a count corresponding to one of said drum storage locations, a first equality circuit for recognizing equality between said drum counter and said first counter, a bistable circuit having a set stable condition and a reset stable condition, said first equality circuit being adapted to place said bistable circuit in the set condition upon equality between said drum counter and said first counter, transfer circuitry responsive to said set condition of said bistable circuit and to said synchronizing signals for transferring said data from said memory to said drum, a second counter for holding a count corresponding to the drum storage location at which said information transfer is to cease, a second equality circuit for recognizing equality between said second counter and said first counter, said second equality circuit being adapted to place said bistable circuit in the reset condition upon equality between said first and said second counters, a third counter for addressing said memory, said first and said third counters having trigger inputs responsive to coincidence of said synchronizing signals and said bistable circuit in its set condition, and means responsive to said second equality circuit upon equality between said drum counter and said first counter for resetting each of said counters and said bistable circuit.

3. The system as claimed in claim 1 wherein said drum has a first section and a second section, said system also including relay means for selectively coupling each of said drum sections to said memory, relay switching means for controlling said selective relay coupling, said relay switching means being responsive to said first counter to select said first drum section or said second drum section and to provide a change signal, and means responsive to said relay change signal for inhibiting said bistable circuit from being set by said first equality circuit until said relay switching has occurred.

References Cited in the file of this patent

UNITED STATES PATENTS

| | | |
|---|---|---|
| 2,540,654 | Cohen | Feb. 6, 1951 |
| 2,679,638 | Bensky | May 25, 1954 |
| 2,856,595 | Selmer | Oct. 14, 1958 |

OTHER REFERENCES

Publication I: Universal High Speed Computers: A Magnetic Store, by Williams, Kilburn and Thomas. Proceedings of Institute of Electrical Engineers, April 1952.